Oct. 30, 1928.

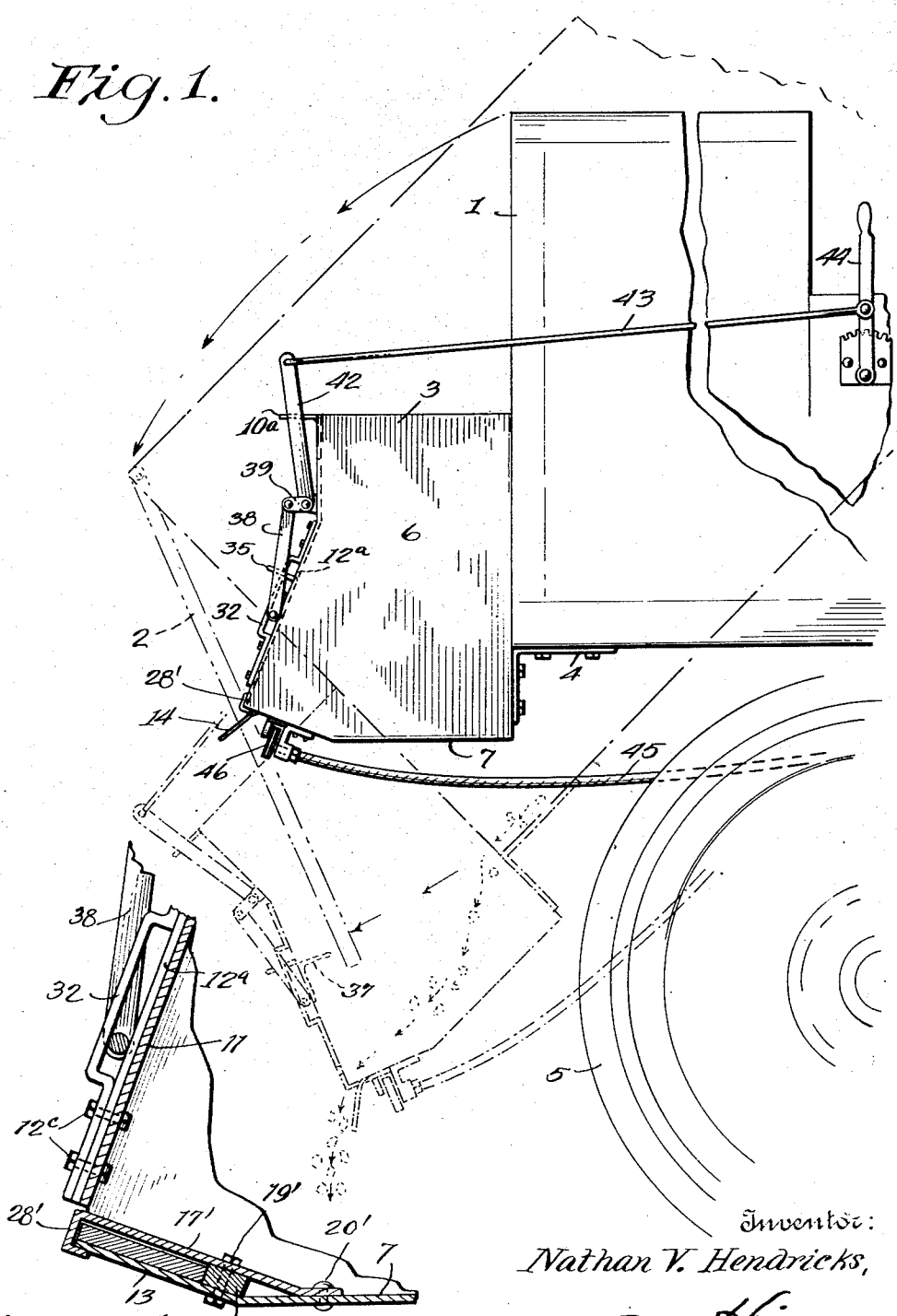

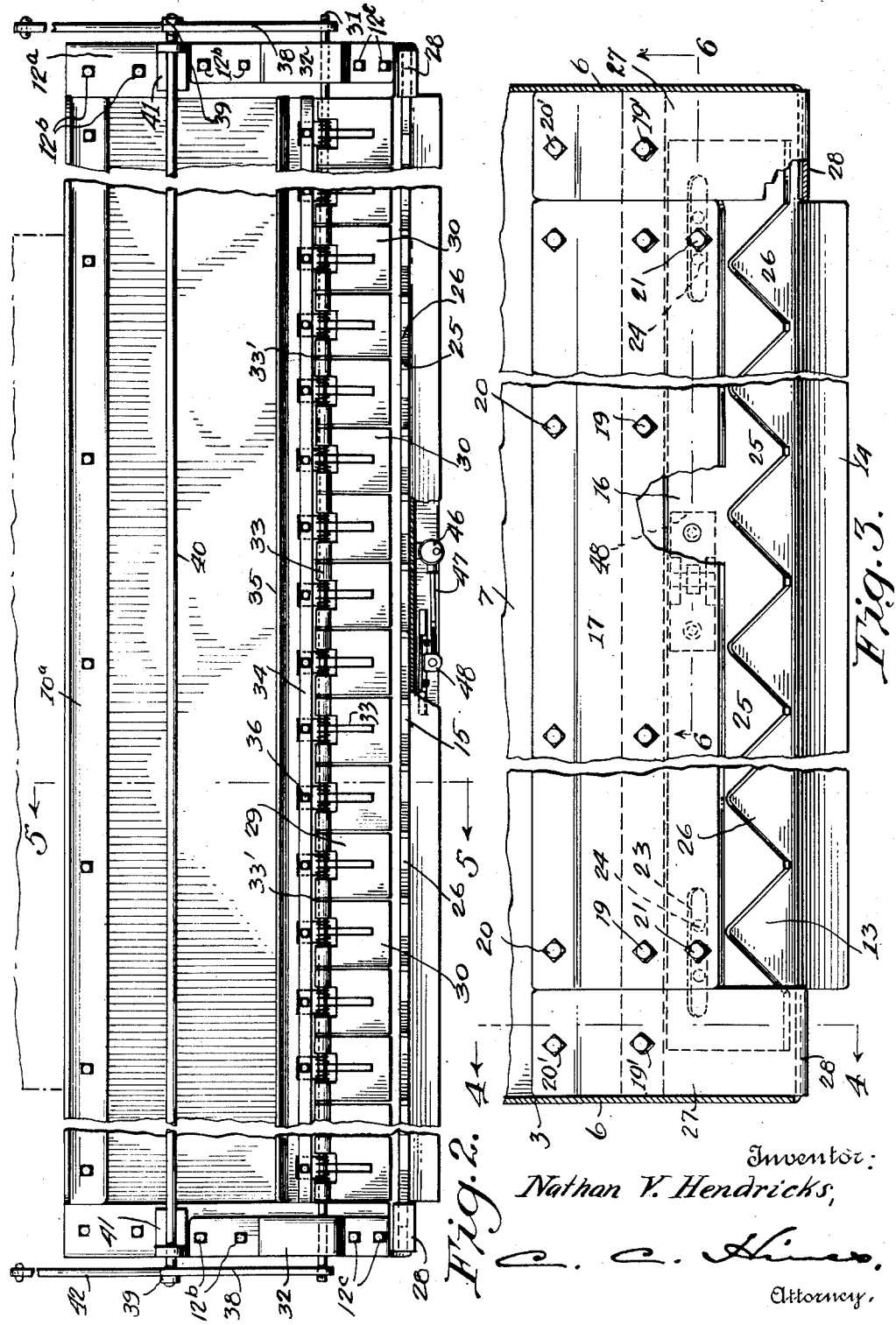

N. V. HENDRICKS 1,690,090

SPREADER

Filed Feb. 16, 1927 4 Sheets-Sheet 3

Inventor:
Nathan V. Hendricks,

Attorney.

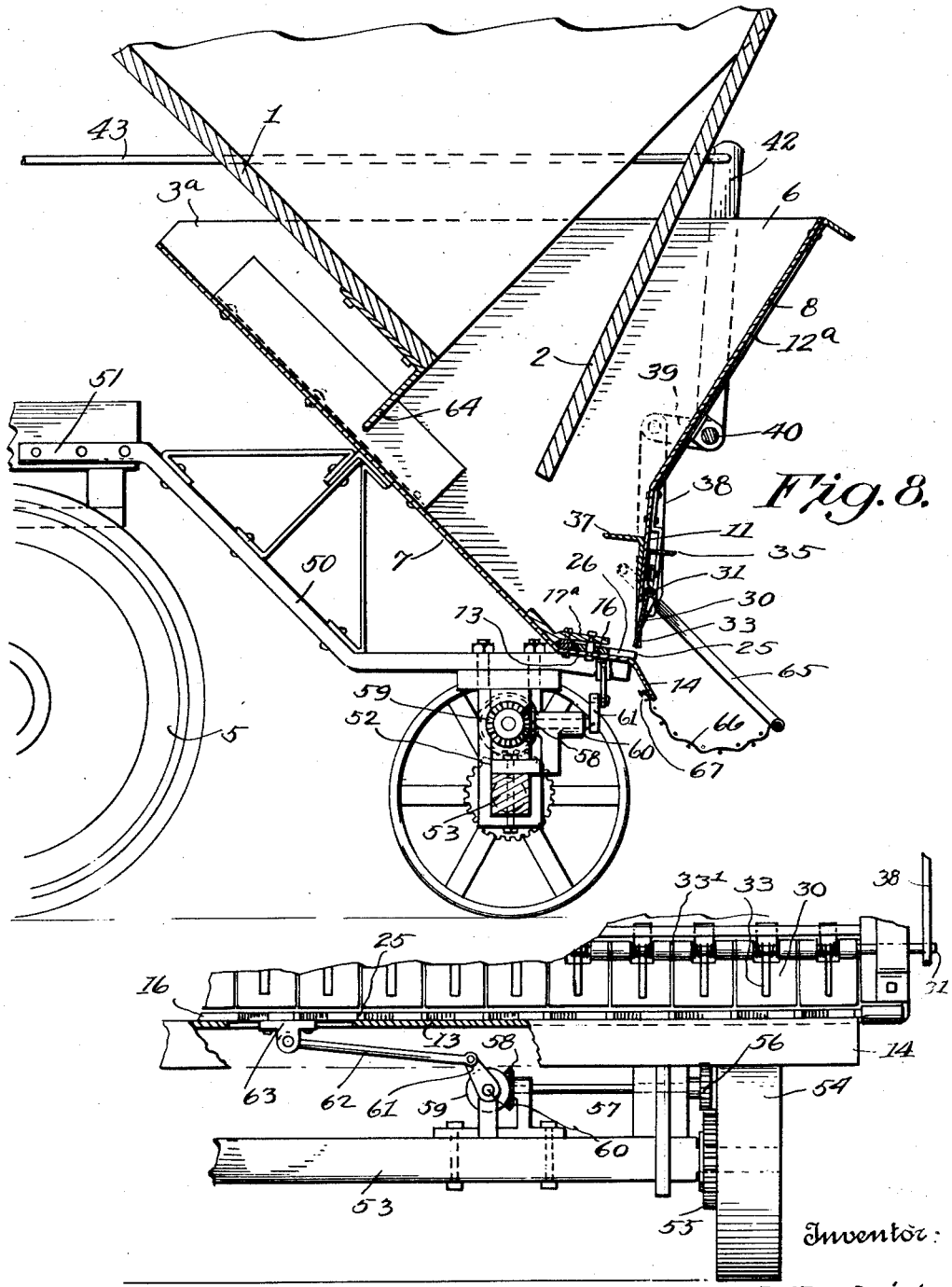

Patented Oct. 30, 1928.

1,690,090

UNITED STATES PATENT OFFICE.

NATHAN V. HENDRICKS, OF MORENCI, MICHIGAN.

SPREADER.

Application filed February 16, 1927. Serial No. 168,649.

This invention relates to spreaders, and has special reference to apparatus for spreading screenings, sand, chips, gravel or other material on road surfaces, although capable of use for other similar purposes, as, for example, spreading fertilizer, stone dust, etc., over land.

One object of the invention is to provide an apparatus whereby materials of the character described may be rapidly, regularly and evenly spread, in any required depth, over a road or other surface.

Another object of the invention is to provide an apparatus whereby material of any grade of coarseness or fineness may be spread to any desired depth over a road or other surface.

Still another object of the invention is to provide an apparatus embodying automatic means for preventing clogging of its discharge outlet, and permitting of the discharge through the outlet of particles of material of larger size than the grade size for which the apparatus is set to discharge.

Still another object of the invention is to provide spreading means which may be applied to an automobile truck or like vehicle, and to receive and spread the material as it discharges from the truck body; and to provide a spreader particularly designed to operate in conjunction with trucks having tilting bodies.

Still another object of the invention is to provide a spreading apparatus which will distribute the material over a width greater than the distance between the wheels of a truck, so that the material may be distributed over an unfinished portion of a road surface without the wheels thereof coming in contact with laid bituminous or other surface material; and also to provide spreading mechanism which will operate equally well on forward or backward movements of the truck so that the material may be spread close to finished road areas without the truck running thereon.

Still another object of the invention is to provide a spreader which may be mounted directly upon the rear of a tilting truck body, or operated as a wheeled trailer in rear of the truck body, and which in either case is adapted to receive and distribute the material discharging from a tilting truck body.

Still another object of the invention is to provide a feeder having a novel construction of feeding or distributing mechanism, adjustable for spreading different sizes or grades of materials, and designed to permit particles of the material of excessive size to discharge without choking the discharge outlet, so that an even and regulated discharge of the material may be secured.

The invention further has for its object to provide a simple, reliable and efficient type of power driven spreader which may be mounted upon a special type of motor driven vehicle or upon any ordinary type of motor driven truck, as desired.

With these and other objects in view, the invention consists of the features of construction, combination and arrangement of parts, hereinafter fully described and claimed, reference being had to the accompanying drawings, in which:—

Figure 1 is a side elevation of the rear end of a vehicle body and the spreader applied thereto, showing in full and dotted lines, respectively, the normal inactive and the tilted working positions of the vehicle body and spreader.

Figure 2 is a rear elevation, partly in section, of the spreader, a portion of the vehicle body appearing in broken lines.

Figure 3 is a sectional plan view of the spreader, taken, for example, on the line 3—3 of Figure 5.

Figure 4 is a vertical front-to-rear section on the line 4—4 of Figure 3.

Figure 8 is a vertical longitudinal section through a modified form of spreader and a tilting vehicle body, showing the latter tilted to dumping or discharge position.

Figure 9 is a fragmentary rear elevation, partially in vertical transverse section, of the apparatus shown in Figure 8.

Figure 5:
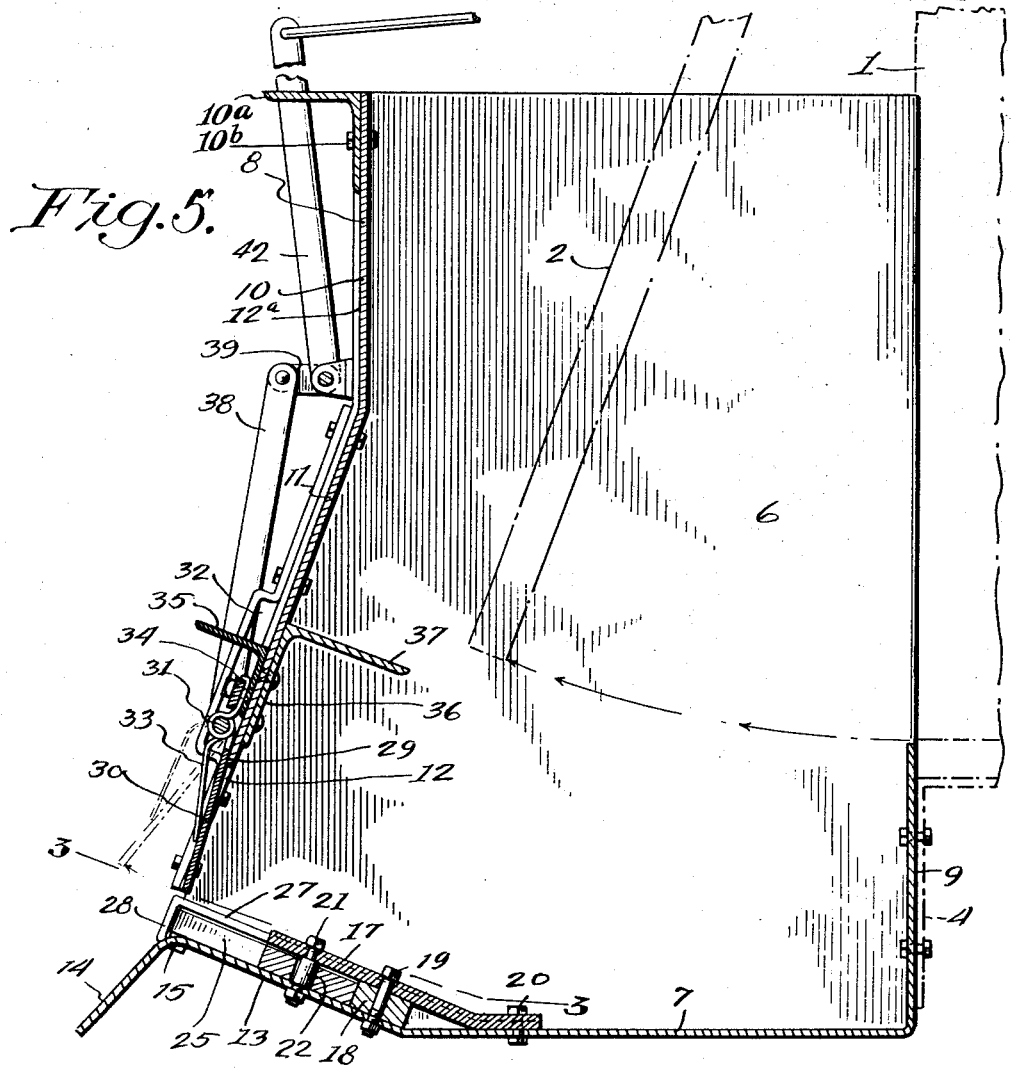
Figure 5 is a vertical front-to-rear section on the line 5—5 of Figure 2.
Figure 6:
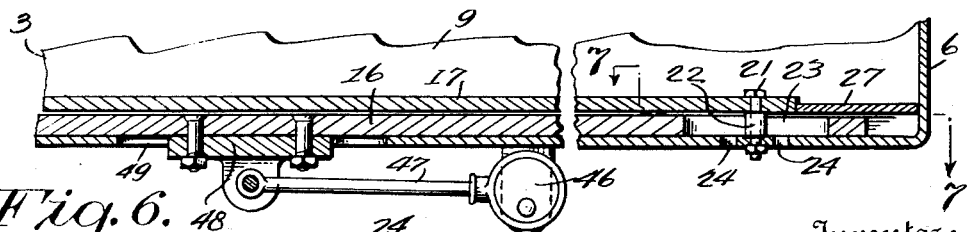
Figure 6 is a vertical transverse section on the line 6—6 of Figure 3.
Figure 7:
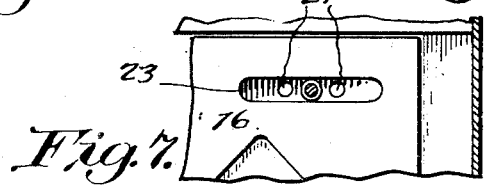
Figure 7 is a horizontal section on the line 7—7 of Figure 6.

Referring now more particularly to Figures 1 to 7, inclusive, in which I have shown a type of spreader adapted to be mounted upon the rear end of a tilting vehicle body in which the material to be dispensed is stored, 1 designates the rear end portion of the body of an automobile truck or other power propelled vehicle, provided with an outwardly swinging end gate 2, pivotally mounted at its upper end or edge to swing outwardly to open position at its lower end or edge. This body 1 may be of a type in common use, in which the body is normally supported in a horizontal or non-dumping position, and is adapted to be tilted downwardly and rearwardly at a suitable angle, say 45° to the horizontal, for the discharge of its load, in which tilting action of the body the gate 2 swings to open position.

Arranged at the rear of the body 1, and directly mounted thereon, is a feeder embodying my invention comprising a casing 3 securely fastened to the underside of the bottom of the vehicle body by suitable bracket members 4, bolted or otherwise fastened in position. The casing 3 is preferably made wholly or in greater part of substantial sheet metal and may be open at top and is normally open at its front side for communication with the body 1 when the gate 2 is swung open. The casing 3, in the form shown, is of greater width than the overall width of the vehicle, so as to extend at its ends outwardly beyond the line of the rear wheels 5 of the vehicle, and said casing comprises side walls 6, a bottom wall 7, a rear wall 8 and a short front wall 9, the latter closing the base of the casing below the rear end of the body 1 and having fastened thereto the bracket 4 whereby the casing is supported. The upper edge of the wall 9 terminates slightly below or flush with the bottom of the body 1, so that the end gate 2 of the body 1 may swing freely into the casing 3 when the body is tilted to dumping position and operate as a deflector to guide the discharging material from the body into the case portion of the casing.

The rear wall 8 of the casing has an upper portion 10 which is straight and vertical and a lower portion 11 which slopes or inclines downwardly and rearwardly at a suitable angle, the adjacent portions of the walls 6 being widened and sloped to conform thereto. The wall portion 10 is stiffened along its upper edge by an angle metal plate 10ª, secured thereto by bolts or rivets 10ᵇ, while the wall portion 11 terminates above the bottom wall 7 to provide an opening 12 extending the full length of the casing. The ends of the opening are, however, covered and closed by the lower ends of reinforcing plates 12ª, whereby the opening 12 forms a discharge outlet longitudinally between the plates 12ª and vertically between the lower edge of the wall portion 11 and the bottom wall 7, which outlet is, therefore, of less length than the width of the casing but of greater length than the distance between the wheels 5. The plates 12ª preferably extend the full depth of the wall portions 10 and 11 and strengthen the casing 3 at its rear corners, and, if desired, these plates may consist of flanges bent from the walls 6 and secured to the wall portions 10 and 11 by bolts or rivets 12ᵇ. This construction of the casing provides a casing with a bottom portion of increased front-to-rear dimensions at its base, and in which the discharge opening 12 is so positioned as to lie at a desirable discharge angle and elevation with relation to the road or ground surface when the body 1 is tilted to discharge position. The bottom wall 7 of the casing is straight and horizontal from its juncture with the front wall 9 up to a point nearly in vertical alinement with the upper portion 10 of the rear wall 8, from which point said wall 7 is bent upwardly and rearwardly, as indicated at 13, and then outwardly and downwardly at an angle as indicated at 14. The portions 13 and 14 are united in line with the outlet 12 by a curved portion 15 forming a rounded discharge edge for the discharging material which thence passes clear of the outlet over the part 14 which forms a guide flange or discharge apron. The inclined wall portion 13 provides a base plate for a reciprocating feeder and coacting parts, which, when the body and casing are tilted to discharge position, disposes the feeder and a discharge gate controlling the outlet 12, hereinafter fully described, in proper relationship for a reliable and efficient discharge of the material through the outlet and onto the apron 14 and thence to the road or ground surface.

The feeder comprises a transversely reciprocating feed bar 16, arranged between the base plate 13 and an overlying guard plate 17 and sliding in contact at its rear edge with a spacing bar 18. This bar 18 extends the full width of the casing between the walls 6 and is secured with the plate 17 to the plate 13 by bolts 19, and the plate 17 extends at its rear edge beyond the bar 18 and over upon the main wall 7 and is secured thereto by bolts 20. The plate 17 is further secured at intervals to the plate 13 by bolts 21 carrying antifriction guide rollers 22, the said bolts and rollers extending through elongated guide slots 23 in the feed bar, whereby said feed bar is adapted to move easily and is guided accurately in its reciprocating movements. The body portion of the plate 17 is arranged to cover the feed bar 16 the distance of the outlet between the plates 12ª and forms with the parts 13 and 18 a guideway or raceway for the body portion of said feed bar in which such body portion of the feed bar is fully enclosed and protected against contact with the material to be dispensed. In order, however, to prevent choking of this raceway or the guide slots 23, by the entrance of dust thereto, clearance openings 24 are provided in the plate 13 through which such dust may discharge. The body portion of the feed plate terminates at its outer edge substantially in line with the outer edge of the plate 17, both of such edges lying a distance inwardly of the vertical plane of the outlet 12 and discharge edge 15, and projecting outwardly from such edge of the bar 16 is a longitudinal series of feed teeth 25 which are preferably V-shaped and are separated by correspondingly shaped openings 26. The side edges or walls of the feed teeth 25 are so inclined to the plane of travel of the feed bar that said walls serve to push the material outward from the spaces 26 and discharge the same through the base of the outlet 12 with a positive feed action. The vertices or points of the teeth 25 project over the rounded discharge edge 15 of the wall 13, which is so curved as to drop downward away from the point of the teeth in such manner that at the moment of release of the chips or other material fed by the teeth they will drop by gravity while they are given a final push, allowing quick clearance of the chips or other material from the feed openings and a more positive, smooth and easy feed of the same in a regular manner over the discharge edge 15 and thence onto the apron 14, from which they drop to the ground. The angular formation of the wall portions 13 and 14, in addition to disposing the feed mechanism in a desired position, also provide a reinforced construction of the feeder supporting portion of the wall 7 and the discharge apron 14, whereby such parts are stiffened and prevented from sagging under the weight of the material in the casing. Cover plates 27 are fastened to the bottom wall portions 7 and 13 by bolts 19' and 20', the first-named of which bolts also secure the ends of the bar 18 in place, and overlie the ends of the feeder at the ends of the raceway. These cover plates are imperforate throughout and cover the teeth 25 and openings 26 of the feeder beyond the ends of the outlet. Each plate 27 is preferably provided at its forward edge with a U-shaped flange or guard terminal 28 closing the ends of the raceway at the front thereof and extending under and bracing the ends of the wall portion 13. It will be apparent that the cover plates allow the feeder to have a full range of movement while preventing access of the material to be discharged to the teeth 25 and openings 26 of the feeder in rear of and beyond the line of the ends of the outlet 12.

The outlet 12 is guarded by an adjustable guard gate or door, generally indicated at 29, extending the distance between the lower ends of the plates 12ª and comprising a continuous series of plates 30. These plates 30 are mounted at their upper edges on a horizontal transverse rod or shaft 31 extending through and vertically slidable in slotted guide brackets 32, arranged at opposite sides of the rear of the casing beyond the ends of the outlet. The plates 30 are arranged close together, with their adjacent edges slightly spaced apart and are provided at their upper edges with hinge knuckles 33 whereby they are pivotally mounted on the rod or shaft 31, the series of plates being vertically movable as a gate unit by adjustment of the rod 31 in the brackets 32 to vary the distance between the lower edges of said plates and the fingers 27, and consequently the effective depth of the discharge opening between the discharge edge 15 and the bottom edge of the unitary gate. Each plate 30 is also mounted by its hinge knuckles upon the shaft 31 to serve as an independent gate, door or valve, which is adapted to open outwardly under pressure to admit of the discharge of portions of the material of excessive size. Washers 33ª are disposed upon the rod 31 between the outer knuckles of the plates 30 to space the edges of the plates a slight but sufficient distance apart to adapt each plate to have freedom of swinging movement without interference from adjacent plates. Between the knuckles of each gate member 30 the rod 31 is exposed, and mounted on said exposed portions of the rod are the coiled portions of pressure springs formed to provide spring arms 33 which bear upon the outer surfaces of the plates, said springs having free end portions extending above the rod 31 and held clamped by a holding or clamping bar 34 against the vertical flange or web of an angle metal stiffening bar 35, to which said clamping bar is secured by bolts or screws 36, whereby the springs are mounted at one end upon the wall portion 11 in a secure manner. The bearing arms 33 of these springs may be such as to bear with any desired degree of pressure on the plates or valves 30 to normally hold the same in closed position, while permitting any one or a number of the plates or valves to open outwardly under pressure to a greater or less degree to permit over-sized chips or over-sized particles of other materials to pass out, thus preventing clogging of the outlet or feeder. The angle metal plate 35 is riveted or otherwise secured with the vertical flange of an inner angle metal plate 36 to the wall 11, so as to stiffen the wall and prevent it from binding or buckling under pressure of the confined material, and the horizontally disposed flange of this plate 36 projects inwardly so as to form a baffle plate or member 37 arranged at an elevation above the feeder to prevent banking of the material upon the feeder, while forming a pocket between it and the feeder into which a determined amount only of the material may pass. When the vehicle body and feeder casing are turned to discharge position, the door 2 swings outwardly so that its lower edge lies in proximity to the plate 37, forming therewith a deflector to guide the material downwardly and to prevent the accumulation of an undesirable amount of the material in the casing at any time. Brackets 32 are fastened at their upper ends to the flanges 12ᵃ and wall portion 11 by certain of the bolts or rivets 12ᵇ and at their lower ends to the lower ends of the flanges 12ᵃ by bolts or rivets 12ᶜ.

Suitable provision may be made for bodily adjusting, that is, raising and lowering, the discharge gate. As shown in the present instance, the rod or shaft 31 has its end portions extending beyond the brackets 32 and each connected by a link 38 with a crank arm 39 on a horizontal transverse shaft 40 journaled in brackets 41 on the casing, the ends of the shaft having connected therewith motion transmitting levers 42 each coupled by a rod 43 with an operating lever 44, the levers 44 being pivotally mounted on opposite sides of the body 1, so that the vehicle driver or an attendant may conveniently rock the shaft 40 to raise and lower the discharge gate as required. Each lever, or at least one of them, may be provided with suitable means for locking it and the gate in adjusted position. The feeder 16 may also be operated in any suitable manner, and in practice is preferably motor driven from the drive mechanism of the motor vehicle or an independent motor mounted thereon. In the present instance I have shown a type of drive mechanism comprising a flexible shaft 45 arranged to actuate an eccentric 46, the strap of which is connected by a rod 47 with a bracket lug 48 fastened to the underside of the feeder 16 and movable in a guide slot 49 in the base plate 13. This bracket lug is secured to the body of the feeder in rear of its toothed feed edge and the slot 49 conformably arranged in the plate 13, so that the slot is normally covered by the feeder in order to prevent the downward discharge of any of the material therethrough. In practice, suitable means may be provided for throwing the drive mechanism into and out of operation as desired, to start and stop the feeder when required, but the arrangement of the drive gearing is preferably such, as shown, that the feeder may be operated on both the forward and backward movements of the vehicle. By this means the material may be spread over a road surface to start or complete a spreading operation, by either a forward or backward movement of the vehicle, as may be found most convenient where the surface to be covered is in proximity to or borders portions where the work is completed or bituminous material laid, so that the wheels of the vehicle will not come in contact with and damage any completed or partly completed surface. The arrangement of the feeder so that it will spread the material beyond the lines of the wheels at opposite sides of the vehicle will also enable spreading operations to be carried out parallel with completed portions of a roadway, or portions on which bituminous material is laid, up to the line of such portions, without the wheels of the vehicle coming in contact therewith and damaging the same.

By reference to Figure 1, it will be seen that when the body 1 is tilted from the normally horizontal carrying position shown in full lines to the dumping and spreading position shown in dotted lines, the material discharging from the body will fall by gravity into the bottom of the casing 3, the amount being governed by the opening movement of the end gate 2, which swings outwardly to a prescribed position, the end gate and baffle plate 37 preventing the material from passing in too large a quantity into the casing and jamming against the wall 11 and discharge gate. Also it will be apparent that with the parts in the dotted line position, the feeder in its reciprocations will discharge the material to be fed evenly, regularly and uniformly over the discharge edge 15 and apron 14 to the ground, the amount discharged at each operation of the feeder being governed by the effective size of the outlet controlled by the vertical adjustment of the discharge gate or door. If the discharge gate is set for the discharge of particles of given size, particles of such size only may discharge, and any particles of larger size will be retained and be held until the pressure is sufficient to force open one of more of the gate valves, which will allow the particles of excessive size to discharge and thereby prevent interference with the regular discharge of the material of proper size or choking of or damage to the feeder. By adjustment of the gate material of any grade to be discharged, from stone dust to chips or particles which are comparatively coarse or large in size, may be discharged and regularly and evenly distributed over a roadway or ground surface. In practice it has been found that, in spreading chips, sand or gravel an oscillating speed of the feed bar ranging from 150 to 200 times per minute gives a very effective feed action, but the bar will also operate efficiently at a greater or less speed. The apparatus when used in spreading chips or screenings over a roadway, is very rapid in operation and distributes the material uniformly and to the exact depth desired over the roadway without waste of material and with an absolute freedom of the distributed material from dirt and other undesirable foreign particles.

In Figures 8 and 9 I have shown a modified form of the invention in which the feeder is built in the form of a wheeled trailer adapted for attachment to the rear end of an automobile truck or other vehicle. The construction here is in general the same as that described with respect to Figures 1 to 7, inclusive, except that a substantially V-shaped casing 3ⁿ is provided, which is mounted upon a frame structure 50 having bracket arms 51 or other means adapting it to be secured to the rear end of the chassis frame of an automobile or other vehicle. This frame 50 is mounted by clips 52 upon an axle 53 carrying supporting wheels 54, one of which has fixed thereto a gear 55. This gear 55 has meshing therewith a pinion 56 mounted on a transmission shaft 57 carrying also a bevel gear 58 meshing with another bevel gear 59 on a shaft 60, the shafts 57 and 60 being suitably supported upon the axle 53, and the shaft 60 being provided with a rotating crank arm 61 coupled by a connecting rod 62 to a lug 63, similar to the lug 48, fastened to the reciprocating feeder 16. This construction provides a type of gearing for reciprocating the feeder from the running gear of the trailer, and so that the feeder will be operated in either direction of movement of the vehicle, that is, whether running forward or backward. I may, in practice, employ any suitable means for throwing this feeder operating gearing into and out of action when it is desired to stop the operation of the feeder while the vehicle is in motion. In the application of this type of device, the casing 3ª is so arranged that the rear end of the tilting vehicle body 1, when tilted to dumping position, will depend thereinto with its open end gate 2 arranged to serve as a deflector, as in the construction disclosed in Figures 1 to 7, inclusive. I may provide the body 1 in this case with a depending baffle plate or flange 64 which will substantially close the space between the bottom wall of the body and the bottom wall 7 of the casing to prevent jamming of the material discharged from the body into the casing between said walls above the level of the rear edge of the bottom of the body 1. The discharge gate structure and feed mechanism used in this form of the invention may be the same as that previously described. I have, however, in this case shown a slight departure, in that the rear edge of the guard plate 17ª terminates flush with the forward edge of the body of the feeder 16, the guard fingers 27 and terminals 28 being dispensed with, but these features may be employed with this form of construction if desired. The operating rods 43 in this type of device may be extended forwardly and coupled to operating levers mounted upon the forward portion of the chassis frame of the vehicle at or adjacent to the driver's seat.

In this form of the invention I have also shown a screen attachment comprising a frame 65 suitably attached to the casing 3ª and having attached thereto an apron 66 of woven wire or other screen material, which may be detachably or otherwise connected, as at 67, to the apron 14, so that the screen will be arranged in the line of discharge of the material between the discharge outlet of the casing and the ground. The openings in this screen may be of gaged mesh, so as to permit particles of a gaged size to pass therethrough, while catching and retaining all over-sized particles and preventing the same from dropping to the ground. By this means the passage to the ground of over-sized particles with those of intended size may be prevented and the over-sized particles removed from the screen at suitable intervals. This screen attachment may also be used in connection with the type of device shown in Figures 1 to 7, inclusive.

From the foregoing description, taken in connection with the drawings, the construction and mode of operation of my improved spreader will be readily understood, and it will be seen that an apparatus of this character is provided by means of which a material of any grade or size may be rapidly, evenly and uniformly distributed over a road or other surface. Other advantages of the invention will be apparent from the foregoing description. While the structures disclosed are preferred, it will be understood that changes in the construction, form and arrangement of parts, falling within the scope of the appended claims, may be made without departing from the spirit or sacrificing any of the advantages of the invention.

Having thus fully described my invention, I claim:

1. In a spreader, a casing having a discharge outlet, a reciprocating toothed feeder for discharging the material through the outlet, and a door guarding the outlet and vertically adjustable to regulate the size thereof, said door comprising or including a plurality of independently openable sections each normally held closed and adapted to open under a predetermined pressure.

2. In a spreader, a casing having a discharge outlet, a reciprocatory feeder for discharging material through the outlet, a door comprising a series of hinged sections guarding said outlet, springs acting on the hinged sections of the door to normally hold them closed and permit them to open outwardly under predetermined pressure, and means for adjusting the door to regulate the size of the outlet.

3. In a spreader, a casing having a discharge outlet provided with a bottom wall having a downwardly curved discharge edge, a reciprocable feeder bar in said casing arranged inwardly of said outlet, and provided with a longitudinal series of feed teeth for discharging the material through the outlet, and means for reciprocating the bar, said teeth having the acting edges thereof inclined outwardly in divergent relation with respect to one another and the points of said teeth being arranged to project over said curved discharge edge and in spaced relation thereto.

4. In a spreader, a casing having an outlet formed through and longitudinally of one wall at the bottom thereof, a shaft extending longitudinally of and above said outlet, a door overlying said outlet comprising a plurality of sections each hingedly suspended from said shaft, resilient elements each bearing upon a door section to maintain the same in position against a predetermined pressure, and means for shifting said shaft for adjusting the door to vary the size of the outlet controlled thereby.

5. In a spreader, a casing having a longitudinally extending outlet formed in one wall adjacent the bottom, a guide and supporting member secured adjacent each end of said outlet, a shaft extending longitudinally of said outlet and having each end in a guide member, a door overlying said outlet comprising a plurality of sections arranged in edge to edge relation, a hinge knuckle formed at the upper edge of each section traversed by said shaft, means for resiliently holding each section in closed position, and means for shifting the ends of the shaft in said supporting members to adjust the door over the outlet.

6. In a spreader, a casing having an outlet opening formed longitudinally of one wall adjacent the bottom of the casing, an elongated guard plate secured along one edge to the casing bottom and having the major portion in spaced relation to said bottom, the opposite edge being spaced from said outlet, a reciprocating bar housed beneath said plate, a plurality of spaced feeder teeth formed longitudinally of said bar and projecting into said outlet, and power means extending through the casing bottom and engaging said bar upon the under side for causing reciprocation of the same.

7. In a spreader, a casing having a discharge outlet, a reciprocating feeder for discharging material through the outlet, a door guarding the outlet and comprising a series of hinged sections, springs arranged to bear on the hinged door sections adapting each section to open outwardly under a predetermined pressure, and means for vertically adjusting the door to vary the size of the outlet.

In testimony whereof I affix my signature.
NATHAN V. HENDRICKS.